United States Patent
Livesay et al.

(10) Patent No.: US 6,837,649 B2
(45) Date of Patent: Jan. 4, 2005

(54) COMPACTOR TOOTH

(75) Inventors: Richard E. Livesay, Peoria, IL (US); Riaz A. Shaikh, Peoria, IL (US)

(73) Assignee: Caterpillar Inc, Peoria, IL (US)

( * ) Notice: Subject to any disclaimer, the term of this patent is extended or adjusted under 35 U.S.C. 154(b) by 0 days.

(21) Appl. No.: 10/728,007

(22) Filed: Dec. 4, 2003

(65) Prior Publication Data

US 2004/0081514 A1 Apr. 29, 2004

Related U.S. Application Data

(60) Division of application No. 10/109,362, filed on Mar. 28, 2002, now Pat. No. 6,712,551, which is a continuation-in-part of application No. 09/995,495, filed on Nov. 27, 2001, now Pat. No. 6,619,883.

(51) Int. Cl.[7] .............................................. E01C 19/26
(52) U.S. Cl. ........................ 404/124; 404/121; 37/454
(58) Field of Search ................................ 404/121, 122, 404/124, 128; 37/452, 454, 456, 453

(56) References Cited

U.S. PATENT DOCUMENTS

| | | | | | |
|---|---|---|---|---|---|
| 1,892,945 A | * | 1/1933 | Griebat | ...................... | 301/44.2 |
| 3,099,191 A | * | 7/1963 | Thomas | ...................... | 404/121 |
| 3,274,908 A | * | 9/1966 | Grant et al. | ................. | 404/121 |
| 3,598,028 A | * | 8/1971 | Grant et al. | ................. | 404/121 |
| 4,668,122 A | * | 5/1987 | Riddle | ......................... | 404/121 |
| 4,919,566 A | * | 4/1990 | Caron et al. | ................. | 404/121 |
| 5,795,097 A | * | 8/1998 | Caron et al. | ................. | 404/121 |
| 6,682,262 B2 | * | 1/2004 | Caron et al. | ................. | 404/124 |
| 2002/0114667 A1 | * | 8/2002 | Kaldenberg et al. | ......... | 404/124 |

* cited by examiner

Primary Examiner—Robert E. Pezzuto
Assistant Examiner—Alexandra K. Pechhold
(74) Attorney, Agent, or Firm—Jeff A Greene; Todd Bennj

(57) ABSTRACT

A compactor tooth has a replaceable wear tip mounted to a mounting block carried on the cylindrical exterior surface of a landfill-compactor wheel of a compactor machine. The mounting block has an external surface formed to engage a complementary internal cavity of the wear tip and includes a pair of circumferentially spaced sides oriented not more than 5 degrees from perpendicular to the cylindrical exterior surface of the wheel. The replaceable tip has a body with an exterior ground-engaging surface, a mounting end and a mounting-base receiving cavity opening through the mounting end. The cavity is configured to receive the mounting block thereinto and has a pair of circumferentially spaced side surfaces configured to be in close abutting relationship to a respective one of the circumferentially spaced sides of said mounting block.

7 Claims, 6 Drawing Sheets

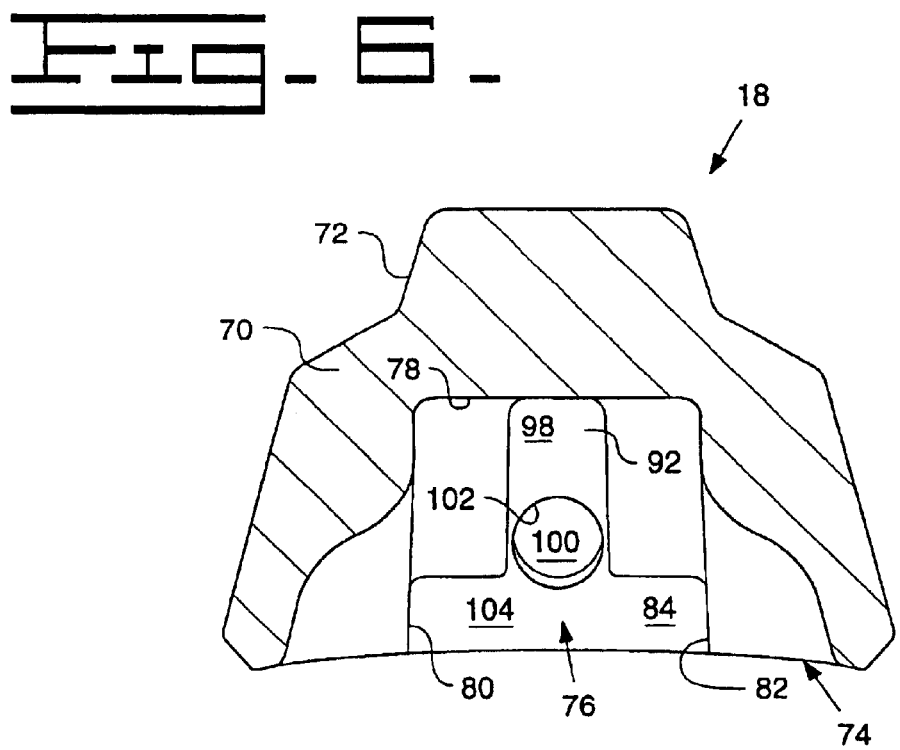
Fig_6_
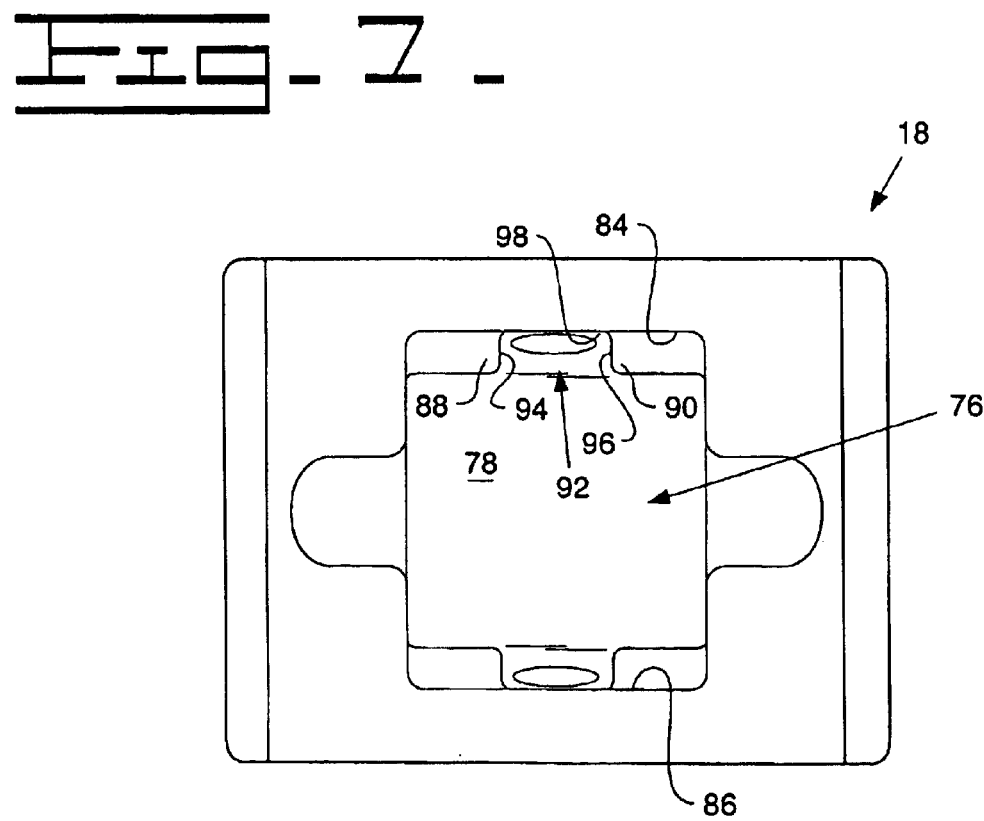
Fig_7_

COMPACTOR TOOTH

This application is a divisional of U.S. patent application Ser. No. 10/109,362, filed Mar. 28, 2002, now U.S. Pat. No. 6,712,551, which in turn is a continuation-in-part of an earlier filed U.S. patent application Ser. No. 09/995,495, filed on Nov. 27, 2001, now U.S. Pat. No. 6,619,883.

TECHNICAL FIELD

This invention relates in general to a compactor tooth for use on a compactor wheel and, more particularly, to a compactor tooth having a replaceable wear tip that is mechanically attached to a mounting block carried on the drum of the compactor wheel.

BACKGROUND

A compactor is a type of self-propelled work machine used at construction sites to compact fill dirt and at landfills to crush and compact waste and refuse materials. In landfill applications, the compaction of such materials reduces the size and bulk of the materials, which are then covered by a layer of soil. Compactors have wheels with large steel drums or rollers. The cylindrical exterior surfaces of such drums are commonly ringed with a large number of teeth to increase the compaction and crushing capability of the compactor. As such teeth are subject to wear, it is desirable to construct such teeth with replaceable tips or wear members, which are detachable mounted to an adapter or mounting block that is welded to the compactor wheel drum. In the past, steel pins and other types of retaining devices have been employed to detachably secure the tips to the mounting blocks. Statutory Invention Registration No. H946 for Tip And Adaptor Assembly, published Aug. 6, 1991 to Alan H. Lonn, discloses a replaceable tip that is pinned to an adapter by the insertion of a pin through aligned apertures in both components. Such pins, however, have been subject to frequent breakage due to loads being exerted on the retaining pin during operation of the compactor. Such pin breakage results in the loss of the tip and damage to the adapter.

It is therefore desirable to provide a compactor tooth that is not subject to failure of the retainer and to provide an improved compactor tooth that overcomes one or more of the problems associated with the above.

SUMMARY OF THE INVENTION

In one aspect of the present invention, a compactor tooth is disclosed for use on the cylindrical exterior surface of a landfill-compactor wheel. The compactor tooth includes a replaceable tip and a mounting block. The mounting block is secured to the cylindrical exterior surface of the wheel and has a mounting surface contacting the cylindrical exterior surface, a top surface remote from the cylindrical exterior surface, a pair of circumferentially spaced sides, and a pair of axially spaced sides. At least one of the circumferentially spaced sides has a retainer pocket defining a bore positioned therein. The replaceable tip has a body with an exterior ground-engaging surface, a mounting end and a mounting block receiving cavity opening through the mounting end. The cavity is configured to receive the mounting block thereinto and has a bottom surface disposed for abutting engagement with the top surface of the mounting block. The cavity also includes a pair of circumferentially spaced side surfaces and a pair of axially spaced side surfaces. The circumferentially spaced side surfaces are configured to be in close abutting relationship to a respective one of the circumferentially spaced sides of the mounting block.

BRIEF DESCRIPTION OF THE DRAWINGS

FIG. 6 is a side cross-sectional view of the tip taken generally along line 6—6 in FIG. 5;

FIG. 7 is a bottom planar view of the tip;

DETAILED DESCRIPTION

Figure 1:
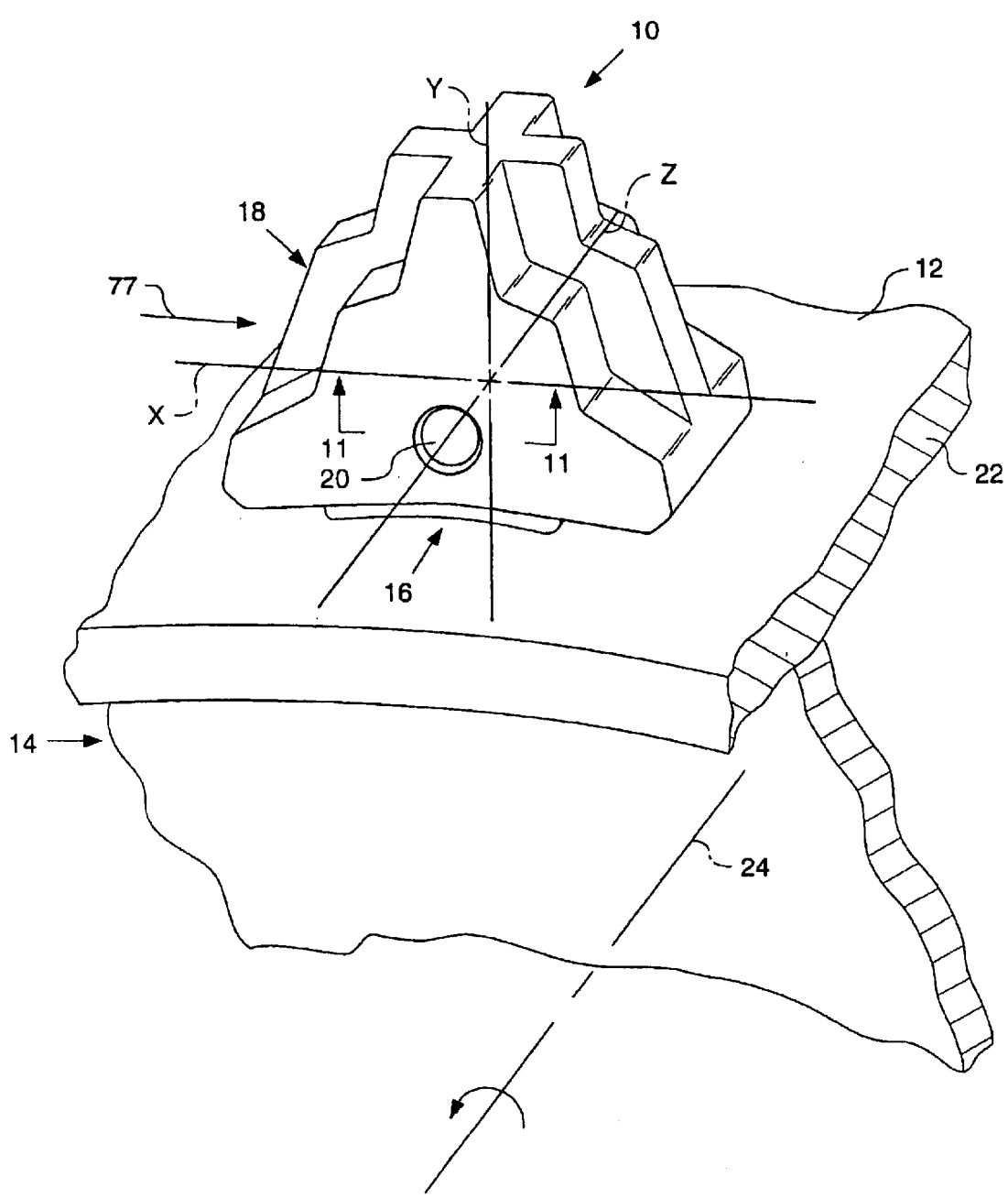
FIG. 1 is a diagrammatic perspective view of a portion of a compactor wheel illustrating one of the compactor teeth of the present invention.

Referring now to FIG. 1, there is illustrated an assembled compactor tooth 10 for use on a landfill-compactor wheel 14 of a compactor work machine (not shown). While only one such tooth 10 is shown, it should be understood that a large number of such teeth 10 are distributed about the cylindrical exterior surface 12 of the compactor wheel 14. Each compactor tooth 10 includes a mounting block 16 and a replaceable wear tip 18, which is selectively retained on the mounting block by a retainer 20. The cylindrical exterior surface 12 is that of a steel drum 22 that is typically used for compactor wheels of compactors, or machines employed for compacting earth in road-building or other types of construction, or for compacting refuse in landfills or the like. The cylindrical exterior surface 12 of the drum 22 is disposed about a central axis 24 of the wheel 14. For directional orientation purposes herein, the tooth 10 in FIG. 1 is shown with 'x', 'y' and 'z' axii, with the 'x' axis extending in a direction which is generally tangential to the circumference of the cylindrical exterior surface 12 of the wheel, the 'y' axis extending in a direction which is generally perpendicular to the central axis 24 of the wheel 14, and the 'z' axis extending in a direction which is generally parallel to the central axis 24.

Accordingly, a reference to an axial direction herein means in a direction generally parallel to the 'z' axis, a reference to a circumferential direction means in a direction generally parallel to the 'x' axis, and a reference to a radial direction means in a direction generally parallel to the 'y' axis.

Figure 2:
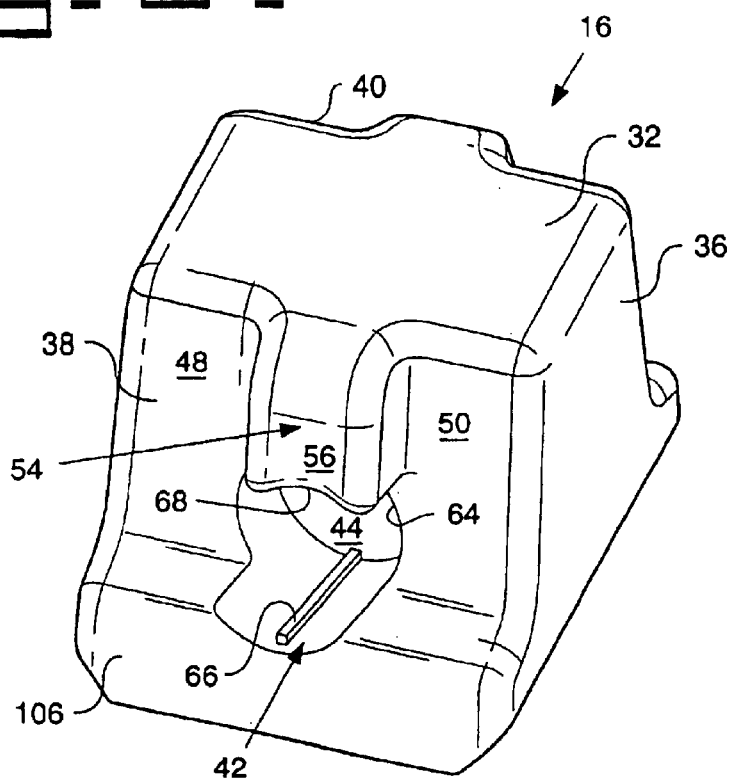
FIG. 2 is an enlarged perspective view of the mounting block of the compactor tooth of FIG. 1.
Figure 3:
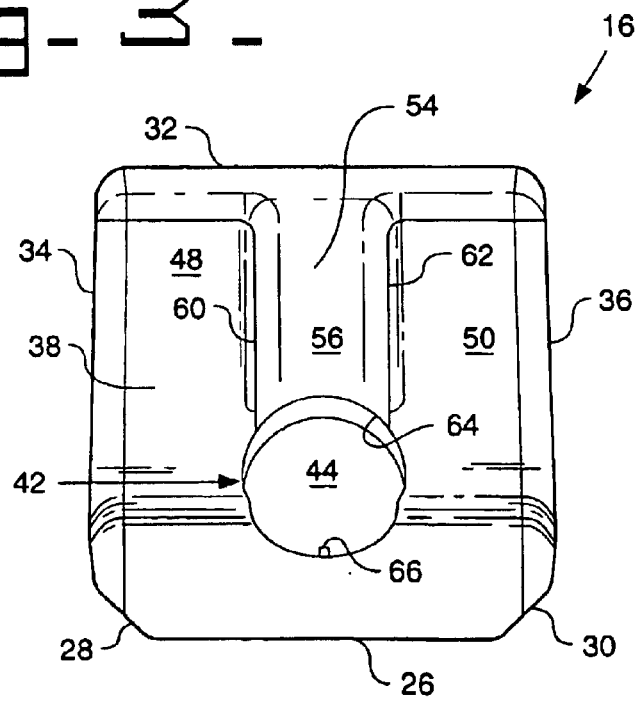
FIG. 3 is a side planar view of the mounting block illustrated in FIG. 2.
Figure 4:
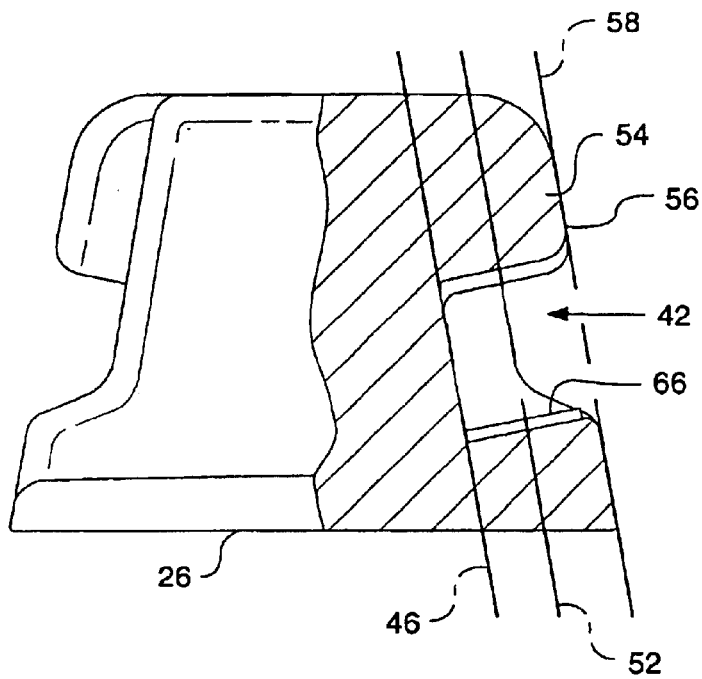
FIG. 4 is a front planar view of the mounting block of FIG. 2, with a portion shown in section.

As depicted in FIGS. 2–4, the mounting block 16 has an arcuate mounting surface 26 for mating contact with cylindrical exterior surface 12 of the compactor wheel 14. The mounting block 16 is secured to the cylindrical exterior surface 12 of the wheel 14 by welding along chamfered edge surfaces at 28,30. The mounting block 16 has a top surface 32 remote from the cylindrical exterior surface 12, a pair of circumferentially spaced sides 34,36, and a pair of axially spaced sides 38,40. For purposes hereinafter described, the circumferentially spaced sides 34,36 are planar and are constructed to extend in a radial direction so as to be oriented at an angle of not more than 5 degrees from perpendicular to the cylindrical exterior surface 12 of the wheel 14.

In one embodiment, at least one of the axially spaced sides 38 of the mounting block 16 has a retainer pocket 42 formed therein having an inward or bottom surface 44 lying along a first plane 46. Such one side 38 further has a pair of edge surfaces 48,50 on opposite sides of the retainer pocket 42 and lying along a second-intermediate plane 52 spaced outboard of the first plane 46.

A generally radially oriented tongue portion 54 has an outer surface 56 disposed along a third-outer plane 58 spaced outboard of the second plane 52. The tongue portion 54 has a pair of opposite circumferentially spaced sides 60,62 spaced a predetermined distance apart. The retainer pocket 42 defines a bore 64 extending inward from the third plane 58 adjacent the tongue portion 54 and terminating at the inward surface 44. The bore 64 has a predetermined diameter so that the bore 64 extends radially outward at a distance greater than the predetermined distance between the sides 60,62 so that the bore 64 extends outboard of the sides 60,62 of the tongue portion 54. Located in the bore 64 the retainer pocket 42 may have an alignment configuration 66 shown as being a raised surface or key member. It should be recognized that the alignment configuration 66 is not required for function of the disclosed arrangement and could be a groove or flat surface in the bore 64 or any of a number of other configurations, the use of which will be described later. The tongue portion 54 is positioned adjacent the retainer pocket 42 and has a concave surface 68, generally facing the cylindrical exterior surface 12 of the wheel 14, that is formed by the bore 64 of the retainer pocket 42. In addition, the opposite side 40 of the mounting block 16 may be configured as described above for the one side 38.

Figure 5:
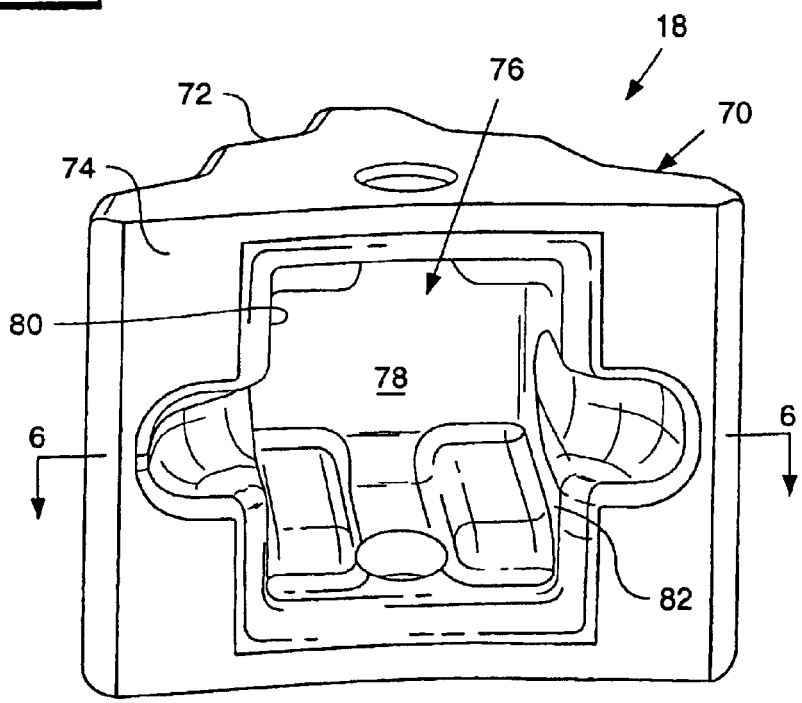
FIG. 5 is a bottom perspective view of the tip of the tooth illustrated in FIG. 1.

As best depicted in FIGS. 5–7, the replaceable tip 18 has a body 70 with an exterior ground-engaging surface 72, a mounting end 74 and a mounting block receiving cavity 76 opening through the mounting end 74. The exterior ground-engaging surface 72 has a stepped "plus"-symbol profile to better crush and compact the materials it engages when a compactor wheel moves across waste material or fill dirt. The portions of the "plus" shape that are aligned parallel to the direction of travel of the compactor wheel provide a crushing, grinding and compacting force on the material being compacted, while the portions of the "plus" shape that are transverse to the direction of travel of the wheel provides the traction of the wheel on the refuse material and/or soil being worked. It should be understood that wheel 14 is a drive wheel, which is driven by the compactor. Therefore, substantial rim-pull forces are transferred from the wheel 14 into the ground through the transverse portions of the teeth 10, such rim pull forces being oriented in the direction of arrow 77 relative to the wheel 14. While the exterior ground-engaging surface 72 is illustrated in a "plus" configuration, it is to be understood that the profile of the exterior ground-engaging surface 72 of the tip 18 may be formed in a number of other configurations as well.

The cavity 76 of the tip 18 is configured to receive the mounting block 16 and has an upper surface 78 disposed for radial load transferring abutting engagement with the top surface 32 of the mounting block 16. The cavity 76 also has sidewalls defining a pair of circumferentially spaced side surfaces 80,82 and a pair of axially spaced side surfaces 84,86. The circumferentially spaced side surfaces 80,82 are configured to be in close abutting relationship to a respective one of the circumferentially spaced sides 34,36 of the mounting block 16 for transferring the rim pull forces generated by the compactor.

At least one of the axially spaced side surfaces 84 of the cavity 76 of the tip 18 includes a pair of circumferentially spaced apart ribs 88,90 defining a generally radially oriented groove 92 therebetween and which provides a pair of opposed side surfaces 94,96 and a transverse surface 98. The groove 92 is adapted to receive the tongue portion 54 on the mounting block 16. The transverse surface 98 is positionable in a close abutting relationship to the outer surface 56 of the tongue portion 54, while the ribs 88,90 are received along their respective edge surfaces 48,50, when the tip 18 is mounted on the mounting block 16. Upon such mounting, the opposed side surfaces 94,96 of the ribs 88,90 are also disposed in close abutting relationship to a respective one of spaced sides 60,62 of the tongue portion 54. The sidewall of the cavity 76 with the one axially spaced side surface 84 further includes an annular through-hole 100 located within the groove 92 and alignable with the retainer pocket 42 in the mounting block 16. The through-hole 100 is generally coaxially aligned with the bore 64, the purpose of which will become subsequently apparent. Such one side surface 84 also has a lower surface 104 disposed along the mounting end 74, which is in close abutting relation to an axially extending foot 106 on the mounting block 16 and employed to transfer axial or side loads between the mounting block 16 and the tip 18. In addition, the opposite side surface 86 of the tip 18 may be configured as described above for the one side 84.

Figure 8:
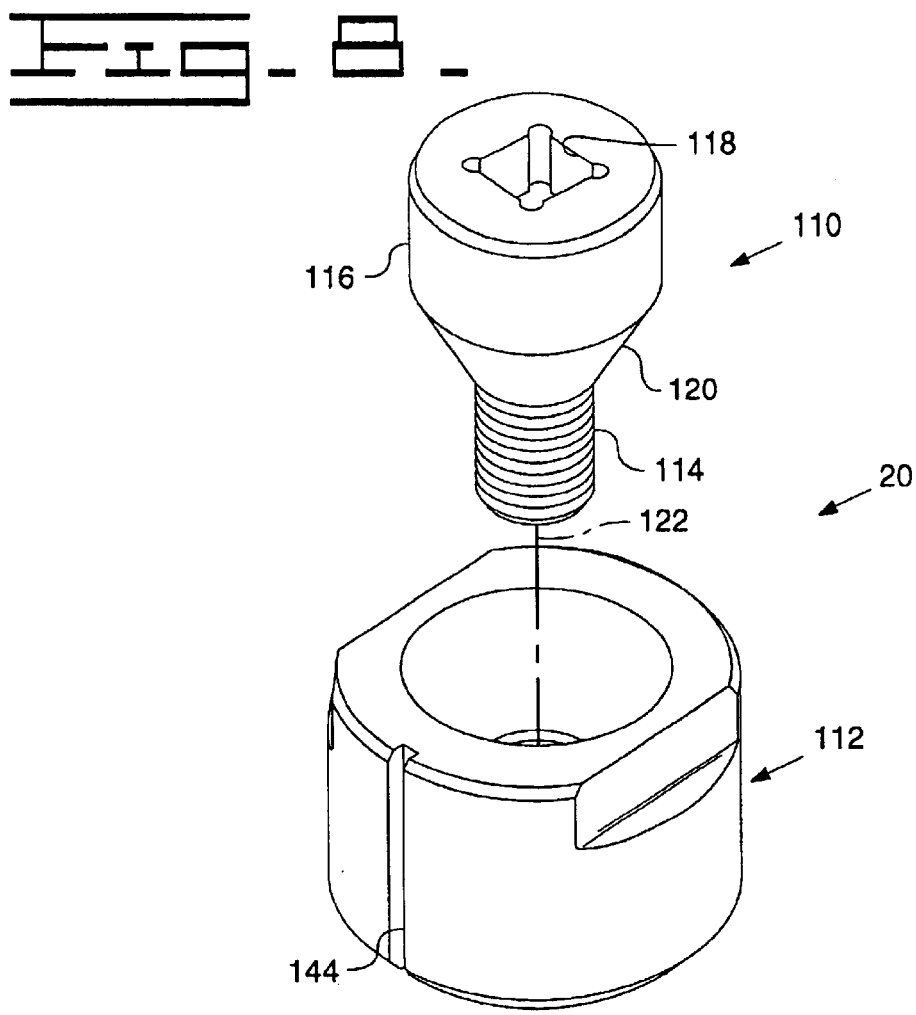
FIG. 8 is an exploded perspective view of the retainer of the present invention.
Figure 9:
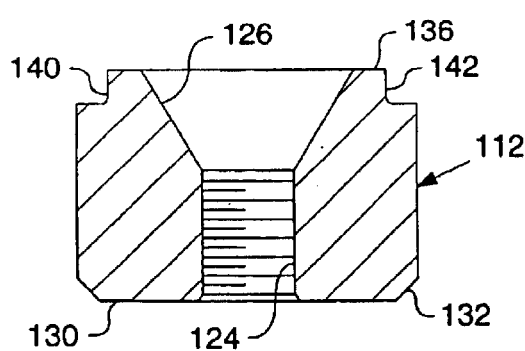
FIG. 9 is a cross-sectional view of the barrel member of the retainer shown in FIG. 8.
Figure 10:
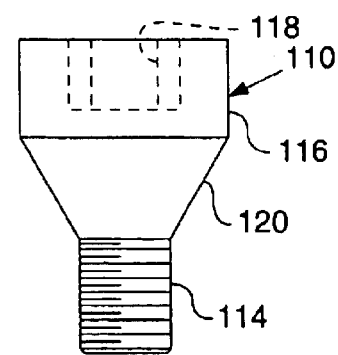
FIG. 10 is a side elevational view of the fastener member of the retainer shown in FIG. 8.
Figure 11:
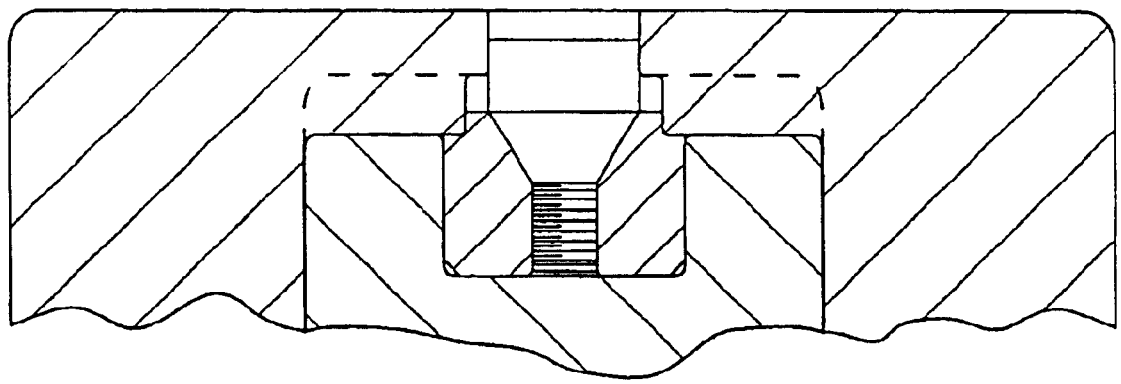
FIG. 11 is a partial cross-sectional view of the tooth taken along line 11—11 of FIG. 1.

Turning now to the retainer 20, as best shown in FIGS. 8–10, such retainer 20 is used for detachable retaining the tip 18 to the mounting block 16. In one embodiment, retainer 20 includes a fastening member 110 and a barrel member 112. The fastening member 110 is provided with a threaded stud portion 114 and a generally cylindrical head portion 116. The cylindrical head portion 116 includes a tool socket 118 in the end thereof. Disposed between the threaded stud portion 114 and the cylindrical head portion 118 is a tapered portion 120 that blendingly connects the threaded stud potion 114 to the cylindrical head portion 118.

The barrel member 112 is generally cylindrical in shape and of a predetermined diameter. The barrel member 112 is disposed along a central axis 122 and has a threaded bore 124 in one end thereof that is adapted to be threadably engaged by the threaded stud portion 114 of the fastening member 110. Positioned in the other end of the barrel member 112 is a tapered socket 126 that is adapted to be engaged by the tapered portion 120 of the fastening member 110. A first end 130 of the barrel member 112, adjacent the threaded bore 124, includes a chamfer 132 that provides a lead for insertion into the retainer pocket 42. A second end 136, adjacent the tapered socket 126, includes a pair of spaced surfaces 140,142. A mating configuration 144 may be coaxially positioned on the generally cylindrical outer surface of the barrel member 112 shown as being a groove. It should be recognized that the mating configuration 144 could be a raised surface or a flat on the generally cylindrical surface of the barrel member 112 or any of a number of other configurations that will mate with the alignment configuration 66 in the bore 64 of the retainer pocket 42.

The barrel member 112 is adapted for receipt into the retainer pocket 42 of the mounting block 16 and to engage one of the tip 18 or the mounting block 16 to prevent the rotation of the barrel member 110 upon the application of a torquing or tightening force thereto by means of a suitable tool which is placed in the tool socket 126 of the fastening member 110. When the tip 18 is placed onto the mounting block 16, the pair of spaced surfaces 140,142 are disposed in close abutting relationship to a respective one of opposed side surfaces 94,96 of the ribs 88,90 of the tip 18. If the alignment configuration 66 and the mating configuration 144 are used, the alignment configuration 66 in the bore 64 of the retainer pocket 42 and the mating configuration 144 of the barrel member 112 allow only a specific orientation so that the replaceable tip 18 is able to be placed on the mounting block 16. Once the tip 18 is mounted, the fastener member 110 is inserted into the through-hole 100 of the side surface 84 of the cavity 76 of the tip 18 and screwed into the threaded bore 124 of the barrel member 110. The predetermined diameter of the cylindrical surface 116 of the fastener member 110 is selected for close receipt of the fastener member 110 in the through-hole 100.

Once assembled, the tip 18 is retained on the mounting block 16 through engagement of the barrel member 112 of the retainer 20 by the fastening member 110 through the hole 100 in the tip 18. While not essential, two of the retainers 20 may be employed in retaining the tip 18, one in either side of tooth 10.

INDUSTRIAL APPLICABILITY

The construction of prior compactor teeth enabled rim pull forces acting on the teeth to be exerted on the retaining pins, causing such pins to break. One of the reasons for this is that the primary load transmitting surface employed on the replaceable tip of prior designs and the mating load carrying surface on the mounting base of such teeth are disposed at too great of an angle relative to the direction of the rim pull forces acting on the tooth. As a consequence, a component of the rim pull force acting in an upward radial direction is created. This radial component force tends to rotate the tip about and lift the tip away from its mounting base. In addition, the opposite lower edge of such prior tips contact the compactor wheel when such rim forces are applied. This creates a pivot point about which the tip rotates relative to the mounting base. Due to the distance from this pivot point and pin, the amount of radial movement of the tip at the pin is increased. As the pin is situated to prevent such radial movement, a high resultant force is thereby applied to the pin, which frequently overloads the pin, causing it to break.

The compactor tooth 10 of the present invention has a construction especially adapted for transferring rim pull forces exerted on the tip 18 into the mounting block 16 in a manner so as to isolate the transmission of such forces from the retainer 20, thus reducing the breakage of such retainer 20. In addition, the construction of the present retainer 20 and its containment in the tooth maximizes its load carrying capabilities, while at the same time relieving such retainer from experiencing the high loads exerted on the pins of prior compactor teeth devices.

The benefits mentioned above are accomplished by various features of the present compactor tooth 10. In particular, the circumferentially spaced sides 34,36 of the mounting block 16 and the corresponding circumferentially spaced sides 80,82 of the tip 18 provide the primary load transferring surfaces for transferring rim pull forces between the tip 18 and mounting block 16. Such surfaces are oriented substantially perpendicular to such rim pull forces acting in the direction of arrow 77. As a consequence, minimal radial components of force are created, thereby reduces the tendency of the tip 18 to pivot relative to the mounting block 16. Also, the mounting end 74 of the tip 18 is constructed so as not to contact the cylindrical exterior surface 12 of the wheel 14 when the tip 18 is mounted upon the mounting block 16. This prevents the edge of the tip 18 from acting as a fulcrum that is located at the greatest distance possible from the retainer 20. In the present structure, such fulcrum is located, if at all, along one of the circumferentially spaced side surfaces 34,36, which are much closer to the retainer 20. Thus, and resulting pivotal movement of the tip at the retainer 20 is reduced as compared to prior compactor teeth.

Retainer breakage is also reduced by the fact that the loads exerted on the retainer 20 are exerted on the generally cylindrical head portion 116 of the fastening member 110 through the hole 100 in the tip 18 on one side and exerted on the barrel member 112 through the concave surface 68 of the tongue portion 56 of the mounting block 16 on the other side.

While this invention is described and shown for use with a compactor, it is to be understood that the present invention could be readily adapted use in other applications, such as for the juncture between a bucket tooth and adapter. This invention has been described in the specification and illustrated in the drawings with reference to an embodiment, the structure of which has been disclosed herein. However, it will also be understood by those skilled in the art to which this invention pertains that various changes or modifications may be made and equivalents may be substituted for elements of the invention without departing from the scope of the claims. Therefore, it is intended that the invention not be limited to the particular embodiment disclosed in the specification and shown in the drawings as the best mode presently known by the inventors for carrying out this invention, nor confined to the details set forth herein, but that the invention shall include all embodiments, modifications and changes as may come within the scope of the following claims.

What is claimed is:

1. A retainer for detachably retaining a tip onto a mounting block on a compactor wheel, comprising:

a cylindrical barrel member of a predetermined diameter, said barrel member being disposed about a central axis and having opposite ends with a first end having a threaded bore therein and a second end having a pair of spaced side surfaces, said spaced side surfaces disposed in abutting relationship to the tip; and a separate fastening member having a cylindrical head portion and a threaded stud portion, said stud portion being adapted for threaded engagement with said threaded bore of said barrel member for detachably mounting said fastener member to said barrel member.

2. The retainer of claim 1, wherein said barrel member includes an alignment configuration being positioned on an outer surface thereof.

3. The retainer of claim 1, wherein said fastener member includes a tapered portion that blendingly connects the threaded portion to the cylindrical head portion.

4. The retainer of claim 2, wherein said barrel member includes a tapered socket that receives the tapered portion of said fastening member.

5. The retainer of claim 1, wherein said fastening member having a tool receiving socket in said cylindrical head portion, said tool receiving socket is adapted for receipt of a tool for rotating said fastening member relative to said barrel member.

6. A method of removably attaching a replaceable tip having at least one spaced surface and an annular through-hole to a mounting block having a retainer pocket, comprising:

inserting a cylindrical barrel member into the retainer pocket;

axially aligning a pair of spaced side surfaces of the cylindrical barrel member with a radially extending rib member of the mounting block;

mounting the replaceable tip onto the mounting block so that the cylindrical barrel member abuts against the at least one spaced surface of the replaceable tip;

inserting a separate fastening member into the annular through-hole; and screwing the separate fastening member into the barrel member.

7. The method of claim 6, wherein the fastening member includes a cylindrical head portion, further including:

inserting a tool into a tool receiving socket in the cylindrical head portion of the fastening member; and rotating the tool to rotate the fastening member relative to the barrel member.

* * * * *